(12) United States Patent
Bossard et al.

(10) Patent No.: US 7,396,385 B1
(45) Date of Patent: Jul. 8, 2008

(54) SYSTEM AND METHOD FOR EFFICIENTLY SEPARATING HYDROGEN GAS FROM A MIXED GAS SOURCE

(76) Inventors: Peter R. Bossard, 106 Railroad Dr., Ivyland, PA (US) 18974; Jacob Mettes, 660 Gillaspie Dr., Boulder, CO (US) 80305

( * ) Notice: Subject to any disclaimer, the term of this patent is extended or adjusted under 35 U.S.C. 154(b) by 489 days.

(21) Appl. No.: 11/097,535

(22) Filed: Mar. 31, 2005

(51) Int. Cl.
*B01D 53/22* (2006.01)
*B01D 69/04* (2006.01)
*B01D 63/06* (2006.01)

(52) U.S. Cl. ................. 95/55; 95/45; 96/8; 96/10
(58) Field of Classification Search .......... 95/45, 95/55, 56; 96/4, 8, 9, 10, 11
See application file for complete search history.

(56) References Cited

U.S. PATENT DOCUMENTS

| | | | |
|---|---|---|---|
| 3,338,681 A * | 8/1967 | Kordesch | 422/211 |
| 4,687,578 A * | 8/1987 | Stookey | 210/321.87 |
| 5,013,437 A * | 5/1991 | Trimmer et al. | 210/321.78 |
| 5,205,841 A * | 4/1993 | Vaiman | 95/46 |
| 5,376,167 A * | 12/1994 | Broutin et al. | 96/8 |
| 5,518,530 A * | 5/1996 | Sakai et al. | 96/11 |
| 5,614,001 A * | 3/1997 | Kosaka et al. | 96/10 |
| 5,820,655 A * | 10/1998 | Gottzmann et al. | 95/54 |
| 5,931,987 A * | 8/1999 | Buxbaum | 95/55 |
| 6,183,543 B1 * | 2/2001 | Buxbuam | 96/11 |
| 6,461,408 B2 * | 10/2002 | Buxbaum | 95/55 |
| 6,565,632 B1 * | 5/2003 | van Hassel et al. | 96/10 |
| 6,569,226 B1 * | 5/2003 | Dorris et al. | 95/56 |
| 6,899,744 B2 * | 5/2005 | Mundschau | 95/56 |

* cited by examiner

*Primary Examiner*—Duane Smith
*Assistant Examiner*—Robert A Clemente
(74) *Attorney, Agent, or Firm*—LaMorte & Associates

(57) ABSTRACT

A hydrogen purification system that is used to separate hydrogen gas from a source gas. The hydrogen purification system has a hydrogen separator into which the source gas is permitted to flow. Within the hydrogen separator is at least one hydrogen permeable tube that is made of a hydrogen permeable material. A support tube is provided for each hydrogen permeable tube. A support tube is coaxially aligned with the hydrogen permeable tube, wherein a gap space exists between the hydrogen permeable tube and the support tube in an area of overlap. The source gas is introduced into the gap space. The source gas spreads thinly over the hydrogen permeable tube in the gap space. Hydrogen from the source gas passes through the hydrogen permeable tube in a highly efficient manner and is collected.

16 Claims, 6 Drawing Sheets

SYSTEM AND METHOD FOR EFFICIENTLY SEPARATING HYDROGEN GAS FROM A MIXED GAS SOURCE

BACKGROUND OF THE INVENTION

1. Field of the Invention

The present invention relates to systems and methods that are used to separate molecular hydrogen from a volume of gas. More particularly, the present invention is related to systems and methods that separate hydrogen from a volume of mixed gas by exposing the mixed gas to a hydrogen permeable material through which only atomic hydrogen can readily pass.

2. Background Art

In industry, there are many applications for the use of molecular hydrogen. However, in many common processes that produce hydrogen, the hydrogen gas produced is not pure. Rather, when hydrogen is produced, the resultant gas is often contaminated with water vapor, hydrocarbons and/or other contaminants. In many instances, however, it is desired to have ultra pure hydrogen. In the art, ultra pure hydrogen is commonly considered to be hydrogen having purity levels of at least 99.999%. In order to achieve such purity levels, hydrogen gas must be actively separated from its contaminants.

In the prior art, one of the most common ways to purify contaminated hydrogen gas is to pass the gas through a conduit made of a hydrogen permeable material, such as palladium or a palladium alloy. As the contaminated hydrogen gas passes through the conduit, atomic hydrogen permeates through the walls of the conduit, thereby separating from the contaminants. In such prior art processes, the conduit is kept internally pressurized and is typically heated to at least three hundred degrees centigrade. Within the conduit, molecular hydrogen disassociates into atomic hydrogen on the surface of the conduit and the conduit absorbs the atomic hydrogen. The atomic hydrogen permeates through the conduit from a high pressure side of the conduit to a low pressure side of the conduit. Once at the low pressure side of the conduit, the atomic hydrogen recombines to form molecular hydrogen. The molecular hydrogen that passes through the walls of the conduit can then be collected for use. Such prior art systems are exemplified by U.S. Pat. No. 5,614,001 to Kosaka et al., entitled Hydrogen Separator, Hydrogen Separating Apparatus And Method For Manufacturing Hydrogen Separator.

The flow rate of hydrogen gas through the walls of a conduit is proportional to the length of the conduit and the thickness of the walls of the conduit. Thus, a highly efficient purification system would have a very long, very thin conduit to maximize flow rate. However, palladium is a very expensive precious metal. Consequently, conduits made of palladium and palladium alloys are very expensive to manufacture. As such, it is desirable to use as little of the palladium as possible in manufacturing a hydrogen gas purification system. Furthermore, conduits made from palladium and palladium alloys typically hold gas under pressure and at high temperatures. Accordingly, the walls of the conduit cannot be made too thin, otherwise the conduit will either rupture or collapse depending upon the pressure gradient present across the wall of the conduit.

A typical prior art hydrogen separator uses coils made from palladium tubing. Coils are used to maximize the surface area of the palladium within a confined space. However, there are many disadvantages associated with the use of coiled tubing. In order for a palladium based hydrogen separator to work, it must be heated to a temperature in excess of 300 degrees Centigrade. As palladium coils are heated to such temperatures, they expand. Furthermore, as hydrogen diffuses through the walls of the palladium coils, the palladium expands significantly. As a palladium coil is repeatedly expanded and contracted, the palladium coil twists. The twisting of the palladium coils fatigues the palladium and causes the palladium to become brittle. Eventually, a palladium coil will crack and the hydrogen separator will cease to work.

Another disadvantage of hydrogen separators that use coiled palladium tubing is that the coils of palladium are very susceptible to vibration damage. The palladium coils within a hydrogen separator act as springs. If the hydrogen separator experiences any vibrations during operation, those vibrations resonate within the palladium coils, causing the palladium coils to move. As the palladium coils resonate and move, the palladium experiences fatigue and becomes brittle. This eventually causes the palladium coils to crack and fail.

Yet another disadvantage of hydrogen separators that use palladium coils is that of contaminant gas back-up. If a hydrocarbon rich gas is introduced into a palladium coil, some hydrogen will disassociate from the hydrocarbon and will pass through the wall of the palladium coil. What is left behind in the palladium coil is mostly carbon and oxygen, which forms carbon dioxide and carbon monoxide. The carbon dioxide and carbon monoxide fill the palladium tube. New hydrocarbon gas must therefore diffuse through this contaminant gas before it can reach the surface of the palladium coil. If there is a large back-up of contaminant gas, the hydrocarbons may take a very long time to reach a palladium surface. Hydrogen in the supply gas must be able to reach the palladium surface in a time frame that is short compared to the residence time of gas in the coil. However, the concentration of the non hydrogen component in the supply gas will increase gradually as more and more hydrogen is removed as the gas stream progresses through the coil. This greatly reduces the efficiency of the hydrogen separator. If the flow in the palladium gas is increased to flush out contaminant gas, hydrocarbons may flow through the palladium tubing before ever having a chance to lose hydrogen through the palladium. This too greatly reduces the efficiency of the hydrogen separator.

To further complicate matters, conduits made from palladium and palladium alloys may become less efficient over time as the interior walls of the conduits become clogged with contaminants. In order to elongate the life of such conduits, many manufacturers attempt to clean the conduits by reverse pressurizing the conduits. In such a procedure, the exterior of the conduit is exposed to pressurized hydrogen. The hydrogen passes through the conduit wall and into the interior of the conduit. As the hydrogen passes into the interior of the conduit, the hydrogen may remove some of the contaminants that have deposited on the interior wall of the conduit.

Due to the generally cylindrical shape of most prior art hydrogen purification conduits, the conduits are capable of withstanding a fairly high pressure gradient when the interior of the conduit is pressurized higher than the exterior of the conduit. However, when such conduits are cleaned and the external pressure of the conduit is raised higher than the interior pressure, a much lower pressure gradient must be used, otherwise the conduit will implode.

In the prior art, improved conduit designs have been developed that attempt to minimize the amount of palladium used in a conduit, yet increase the strength of the conduit. One such prior art device is shown in U.S. Pat. No. 4,699,637 to Iniotakis, entitled Hydrogen Permeation Membrane. In the Iniotakis patent, a thin layer of palladium is reinforced between two layers of mesh. The laminar structure is then rolled into a conduit. Such a structure uses less palladium. However, the conduit is incapable of holding the same pressure gradient as solid palladium conduits. Accordingly, the increase in efficiency provided by the thinner palladium layer is partially offset by the decreased pressure limits, and thus gas flow rate, that are capable of being processed.

A need therefore exists for a hydrogen separator that uses palladium tubing, yet greatly reduces the susceptibility of the palladium tubing to cycle fatigue damage.

A need also exists for a hydrogen separator that optimizes the exposure of gas to palladium surfaces, thereby minimizing the need for hydrogen to diffuse through contaminant gases.

Lastly, a need exists for a hydrogen separator that enables a large concentration of hydrocarbon gas to pass through palladium conduits without having the hydrocarbons being swept out of the conduits by the flow of gas.

These needs are met by the present invention as described and claimed below.

SUMMARY OF THE INVENTION

The present invention is a hydrogen purification system that is used to separate hydrogen gas from a source gas. The hydrogen purification system includes a hydrogen separator into which the source gas is permitted to flow. Within the hydrogen separator is at least one hydrogen permeable tube having an open first end and a closed second end. Each hydrogen permeable tube is made of a hydrogen permeable material, such as palladium or a palladium alloy.

A support tube is provided for each hydrogen permeable tube. A support tube is coaxially aligned with the hydrogen permeable tube, wherein a gap space exists between the hydrogen permeable tube and the support tube in an area of overlap.

The source gas is introduced into the gap space. The source gas spreads thinly over the hydrogen permeable tube in the gap space. Hydrogen from the source gas passes through the hydrogen permeable tube in a highly efficient manner and is collected.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

The present invention system provides a means for purifying a hydrogen gas at a high flow rate, using a small amount of space and a small amount of precious metals.

Figure 1:
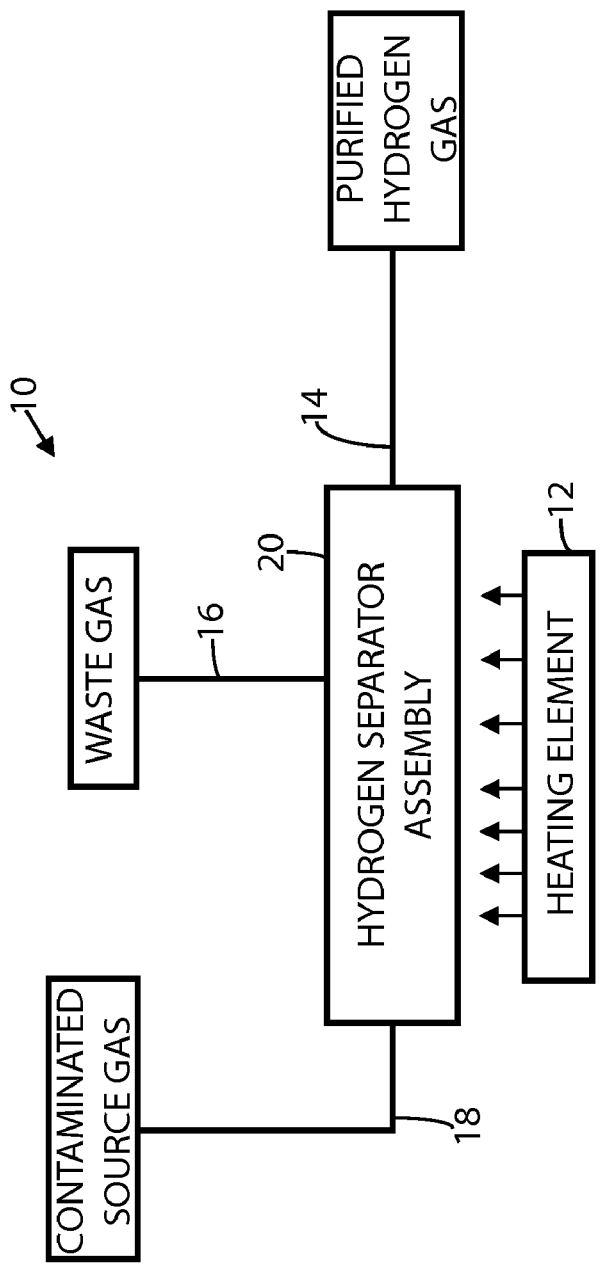
FIG. 1 is a schematic of an exemplary embodiment of a hydrogen purification system.

Referring to FIG. 1, there is shown a schematic of an exemplary embodiment of a hydrogen purification system 10 in accordance with the present invention. The hydrogen purification system 10 contains a hydrogen separator 20. The hydrogen separator 20 is coupled to a source of contaminated gas that contains hydrocarbons or contaminated hydrogen gas. For example, the contaminated source gas can be heated diesel fuel, ethanol, gasoline or simply hydrogen mixed with water vapor.

The hydrogen separator 20 is heated to an operating temperature by external heating elements 12. The hydrogen separator 20 separates hydrogen from the contaminated source gas, thereby producing ultra pure hydrogen and waste gas. The ultra pure hydrogen is collected though a first collection port 14. The waste gas is collected through a second waste gas collection port 16.

Figure 2:
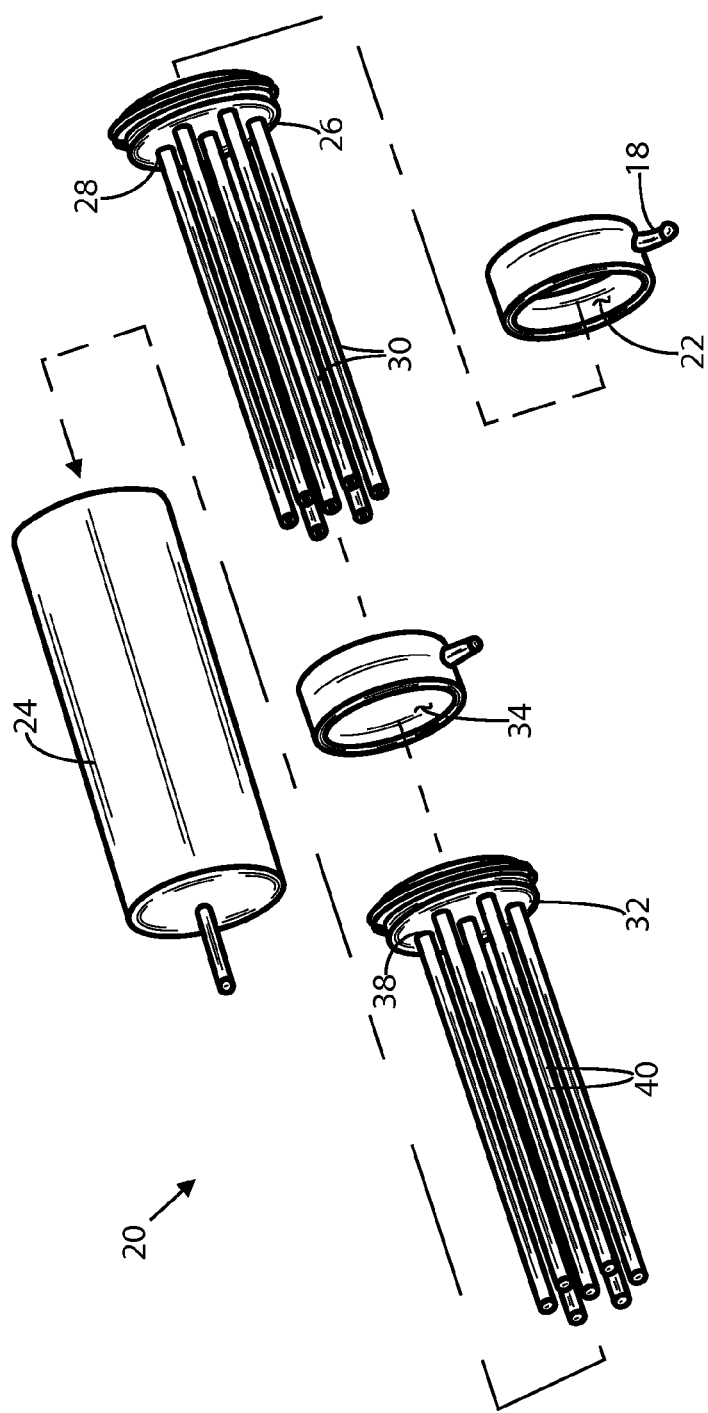
FIG. 2 is an exploded view of an exemplary hydrogen separator.

The contaminated source gas enters the hydrogen separator 20 through a supply port 18. Referring to FIG. 2, in conjunction with FIG. 3, it can be seen that the supply port 18 leads into a plenum chamber 22 at one end of an enclosed housing 24. The enclosed housing 24 is preferably made of stainless steel or another high strength alloy that is non-reactive to any of the component gases contained within the contaminated source gas.

The plenum chamber 22 is defined between the interior of the enclosed housing 24 and a first perforated wall 26. The perforated wall 26 contains a plurality of holes 28 that are symmetrically arranged in a highly space efficient manner. The holes 28 are preferably spaced as densely as possible while still maintaining a predetermined minimum area of material around each of the holes 28.

A plurality of support tubes 30 extend from the first perforated wall 26. The support tubes 30 have solid walls with opposing open ends. The support tubes 30 are joined to the first perforated wall 26 at each of the holes 28. In this manner, the holes 28 communicate with the interior of the support tubes 30 and any gas flowing out of the plenum chamber 22 through the first perforated wall 26 must flow through the support tubes 30.

The support tubes 30 have a length nearly as long as the interior of the enclosed housing 24. The support tubes 30 and the perforated wall 26 are preferably made of the same non-reactive material as is the enclosed housing 24. In this manner, the first perforated wall 26, and the support tubes 30 have the same coefficient of thermal expansion as does the enclosed housing 24.

A second perforated wall 32 is disposed within the enclosed housing 24 at a point adjacent to the first perforated wall 26. The second perforated wall 32 creates two additional chambers within the enclosed housing 24 in addition to the plenum chamber 22. A waste gas collection chamber 34 is created between the first perforated wall 26 and the second perforated wall 32. Lastly, a hydrogen collection chamber 36 is created between the second perforated wall 32 and the second end of the enclosed housing 24.

The second perforated wall 32 defines a plurality of holes 38 that are slightly larger than the diameter of the support tubes 30 that are extending from the first perforated wall 26. The holes 38 in the second perforated wall 32 are aligned with the support tubes 30, thereby allowing the support tubes 30 to extend through the second perforated wall 32.

A plurality of hydrogen permeable tubes 40 are coupled to the second perforated wall 32. The hydrogen permeable tubes 40 are aligned with the holes 38 in the second perforated wall 32 and pass around the support tubes 30. It will therefore be understood that the hydrogen permeable tubes 40 are coaxially aligned with the support tubes 30 and surround the support tubes 30. The hydrogen permeable tubes 40 are preferably palladium or a palladium based alloy, such as a palladium/silver alloy.

Figure 4:
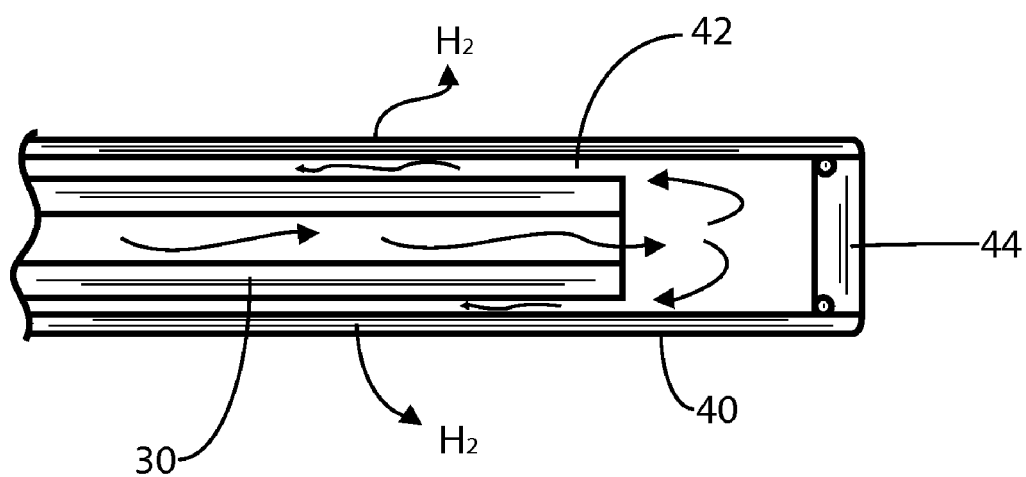
FIG. 4 is an enlarged view of section 4, shown in FIG. 3.

Referring to FIG. 4, it can be seen that a gap space 42 exists between the outside surface of the support tubes 30 and the inside surface of the hydrogen permeable tubes 40. The size of the gap space 42 is dependent upon the thickness of the walls of the hydrogen permeable tubes 40. Preferably, the size of the gap space 42 is between two times (2×) and ten times (10×) the thickness of the wall that forms the hydrogen permeable tubes 40. The gap space 42 runs along the length of the support tubes 30 in the area that the hydrogen permeable tubes 40 overlap the support tubes 30. This length is preferably between three inches and twelve inches. The size of the gap space 42 is important to the functionality of the hydrogen separator 20, as will later be explained.

The hydrogen permeable tubes 40 are longer than the support tubes 30 they surround. The free ends of the hydrogen permeable tubes 40 are closed. In the shown embodiment, an internal end cap 44 is internally brazed in place at the end of each of the hydrogen permeable tubes 40. The end caps 44 are preferably brazed to the inside of the hydrogen permeable tubes 40. In this manner, the end caps 44 do not restrict the hydrogen permeable tubes 40 from expanding outwardly when heated and saturated with molecular hydrogen.

The capped ends of each of the hydrogen permeable tubes 40 is also a predetermined distance from the end 45 (FIG. 2) of the enclosed housing 24 (FIG. 2). The predetermined distance is greater than any change in length of the hydrogen permeable tubes 40 caused by temperature and hydrogen swelling. In this manner, the hydrogen permeable tubes 40 are free to expand without restriction.

The hydrogen permeable tubes 40 are straight. Consequently, mechanical stresses caused by differences in thermal and hydrogen expansion between the membrane and its support are eliminated. The hydrogen permeable tubes 40 are supported at one, and only one, fixed point along the length of each tube. This basic concept allows the hydrogen permeable tube 40 to expand freely under varying temperature and hydrogen absorption conditions.

Figure 3:
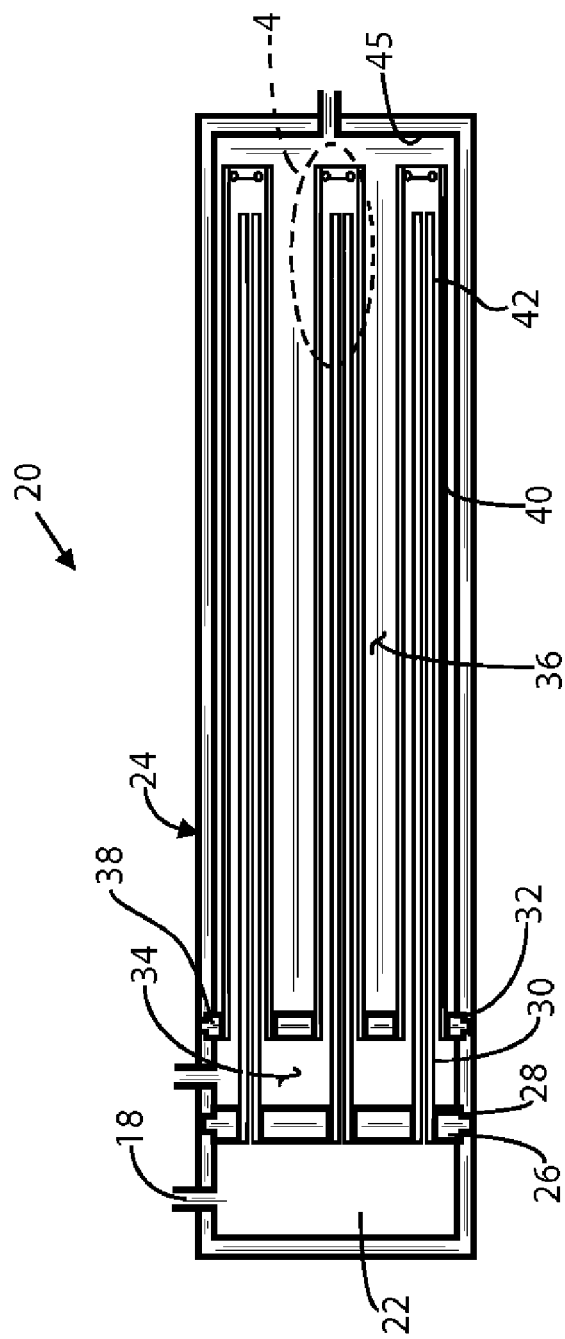
FIG. 3 is a cross-sectional view of the hydrogen separator shown in FIG. 2.

Referring both to FIG. 3 and FIG. 2, it will be understood that in operation, the enclosed housing 24 and all its contents are heated to an operating temperature in excess of 300 degrees Centigrade. A contaminated supply gas is introduced into the plenum chamber 22. The contaminated gas fills the plenum chamber 22 and flows into the support tubes 30 through the first perforated wall 26. The contaminated gas exits the far end of the support tubes 30 and is forced to flow through the gap space 42 that exists between the exterior of the support tubes 30 and the interior of the surrounding hydrogen permeable tubes 40. The gap space 42 drains into the waste gas collection chamber 34. However, as the contaminated source gas flows through the gap space 42, the flowing gas spreads thinly over the outside surfaces of the hydrogen permeable tubes 40. The length and width of the gap space 42, as well as the gas flow rate, are engineered to maximize the efficiency at which the hydrogen gas permeates through the hydrogen permeable tubes 40. By spreading the contaminated gas thinly over the surfaces of the hydrogen permeable tubes 40, the hydrogen contained within the contaminated gas does not have to diffuse far before it contacts hydrogen permeable material. In this manner, a high percentage of the hydrogen available in the contaminated gas is provided with the opportunity to disassociate from the contaminated gas and pass through the hydrogen permeable tubes 40. Depending upon operating parameters, a hydrogen diffusion efficiency in excess of eighty percent can be achieved.

As hydrogen gas passes through the hydrogen permeable tubes 40, the hydrogen gas passes into the collection chamber 36 of the enclosed housing 24. The hydrogen gas in the collection chamber 36 is then drawn out of the collection chamber 36 for use. The hydrogen gas is ultra pure, being that only molecular hydrogen is capable of dissociating from the contaminated source gas and pass through the hydrogen permeable tubes 40.

The non-hydrogen components of the contaminated source gas flow through the gap spaces 42 and into the waste gas collection chamber 34. The waste gas is then drawn out of the hydrogen separator 20. The pressure of the hydrogen gas collection chamber 36 is kept lower than the pressure of the waste gas collection chamber 34. In this manner, there is a positive pressure differential between the gap space 42 and the hydrogen collection chamber 36 that encourages the flow of hydrogen through the hydrogen permeable tubes 40 and into the hydrogen collection chamber 36.

The gap space 42 is created by the coaxial positioning of the support tubes 30 within the hydrogen permeable tubes 40. However, other advantages are created by such structuring. During normal operation, the hydrogen permeable tubes 40 are internally pressurized, and therefore expand outwardly away from the inner support tubes 30. However, if the hydrogen separator 20 is ever reverse pressurized, either by accident or purposely for cleaning, the hydrogen permeable tubes 40 are externally pressurized and are caused to contract upon the support tubes 30. The support tubes 30 provide structural integrity to the hydrogen permeable tubes 40 and prevent the hydrogen permeable tubes 40 from collapsing. The positioning of the support tubes 30 in the hydrogen permeable tubes 40 therefore makes the overall hydrogen separator 20 far more resistant to damage from reverse pressurization.

For a given wall thickness, a small diameter tube can withstand a higher pressure differential across the wall than a larger diameter tube. This is because the stresses experienced by the walls of a tube are equal to the pressure drop over the wall times the tube radius, divided by the wall thickness. A practical hydrogen separator has to pass large gas flows with relatively small losses of pressure drop, which seems to exclude the use of a single, or a small number of, small diameter tubes. Moreover, the exposed wall area in a small diameter tube is relatively small. The present invention addresses these issues by implementing many relatively short, small diameter hydrogen permeable tubes 40 in parallel.

Figure 5:
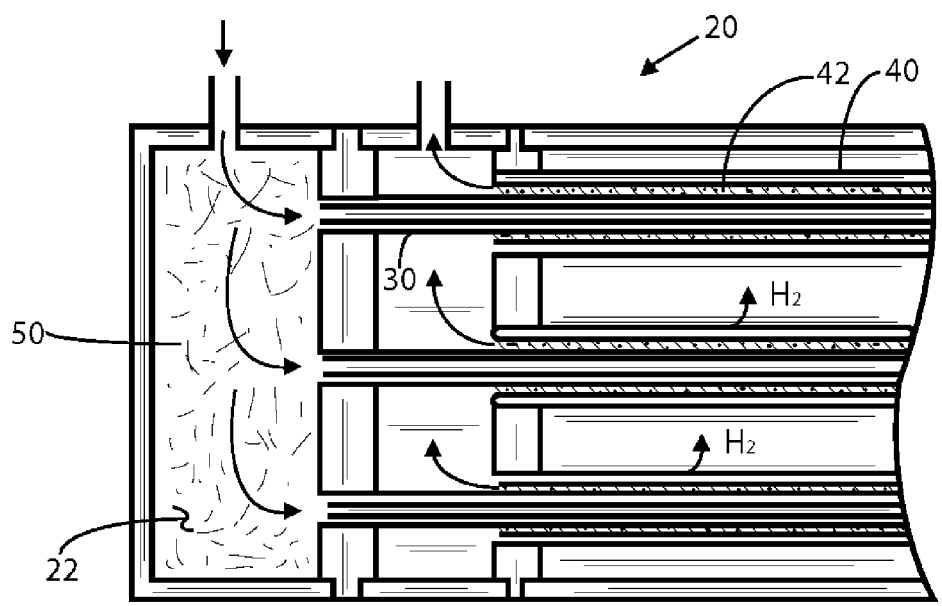
FIG. 5 is a cross-sectional view of an alternate embodiment of a hydrogen separator.

Depending upon the contaminated source gas that is used, it may be desirable to condition the contaminated source gas by passing the contaminated source gas through a catalyst. Referring to FIG. 5, it can be seen that the plenum chamber 22 of the hydrogen separator can be filled with a catalyst 50. Consequently, any gas that flows into the support tubes 30 and into the hydrogen permeable tubes 40 must first flow through the catalyst 50. The catalyst 50 selected is dependent upon the contaminated source gas being used. For example, if the contaminated source gas is petroleum distillate, catalysts such as iron chromium oxide, copper zinc oxide and certain noble metals can be used to help break apart the complex hydrocarbons present in such a gas.

In order to increase the effectiveness of the catalyst 50, the catalyst material can also be introduced into the gap space 42 between the support tubes 30 and the hydrogen permeable tubes 40. The positioning of the catalyst 50 in the gap space 42 is also shown in FIG. 5. In this manner, contaminated source gas can be effected by the catalyst at the same time that hydrogen is being removed from the contaminant gas. Since the partial pressure of hydrogen gas will be low in the gap space 42, the catalyst can be more effective in helping free hydrogen molecules from the hydrocarbons in the gas.

Figure 6:
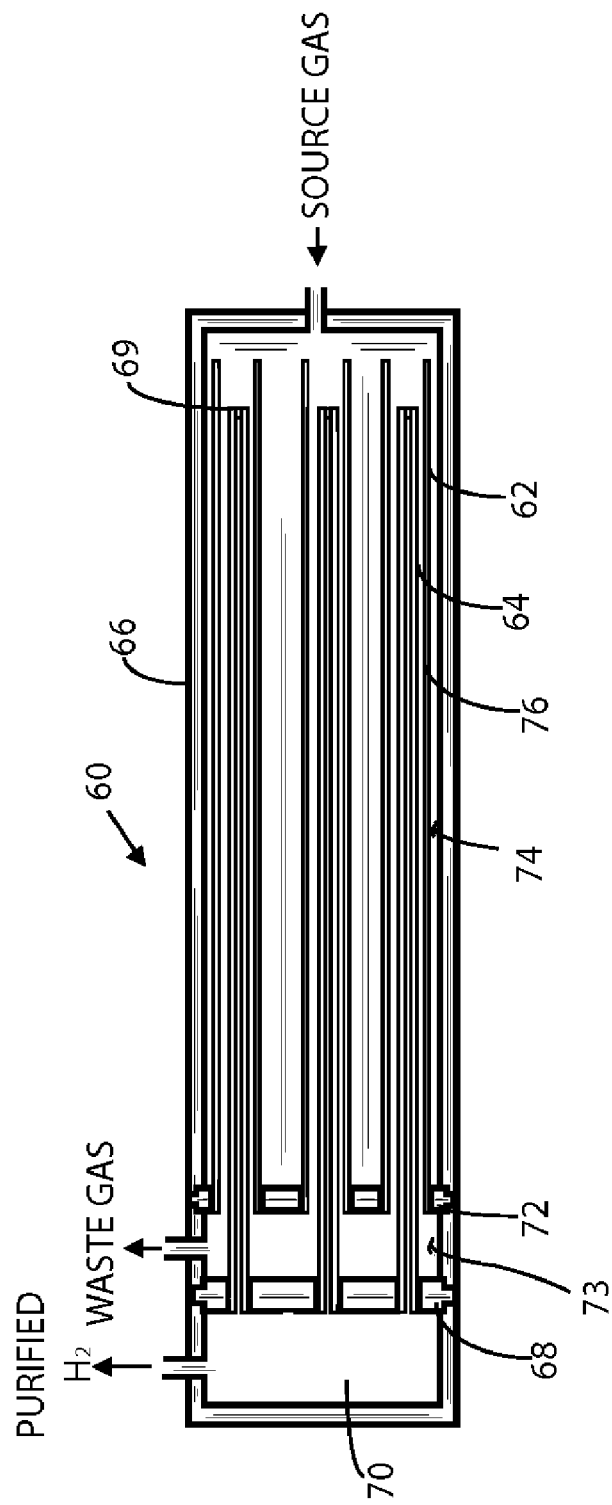
FIG. 6 is a cross-sectional view of another alternate embodiment of a hydrogen separator.

In the embodiments of the present invention thus shown, hydrogen permeable tubes 40 are placed around support tubes 30. Contaminated source gas is then allowed to flow between the support tubes 30 and the hydrogen permeable tubes 40. Referring now to FIG. 6, an alternate embodiment of a hydrogen separator 60 is shown, where support tubes 62 are placed around the outside of hydrogen permeable tubes 64.

In this embodiment, there is an enclosed housing 66. Hydrogen permeable tubes 64 extend from a first perforated wall 68 within the enclosed housing 66. The hydrogen permeable tubes 64 have capped ends 69. A collection chamber 70 is formed between the end of the enclosed housing 66 and the first perforated wall 68. The collection chamber 70 communicates with the interior of the hydrogen permeable tubes 64.

A second perforated wall 72 is positioned within the enclosed housing 66. A waste gas collection chamber 73 is formed between the first perforated wall 68 and the second perforated wall 72. A plurality of support tubes 62 extend from the second perforated wall 72. The support tubes 62 are aligned with the hydrogen permeable tubes 64 and surround the hydrogen permeable tubes 64.

A plenum chamber 74 is formed between the second perforated wall 72 and the far end of the enclosed housing 66. Contaminated source gas is introduced into the plenum chamber 74. The contaminated source gas flows into the support tubes 62 and through a gap space 76 that separates the support tubes 62 from the interior hydrogen permeable tubes 64. Hydrogen gas passes through the material of the hydrogen permeable tubes 64 as it flows through the gap spaces 76. The hydrogen gas passing into the hydrogen permeable tubes 64 is collected in the collection chamber 70. Waste gas that flows through the gap spaces 76 is collected in a waste gas chamber 78 and is removed from the hydrogen separator 60.

It will be understood that the embodiments of the hydrogen separators that are shown are merely exemplary and that a person skilled in the art can make many changes to the shown embodiments. For example, the shown embodiments only have a few support tubes and hydrogen permeable tubes. It will be understood that embodiments of the present invention can be made where hundreds of such tubes are used. It will further be understood that hydrogen permeable tubes can be positioned either inside or outside support tubes, provided a gap space exists between the support tubes and the hydrogen permeable tubes. Furthermore, catalysts can be included within the hydrogen separator depending upon the type of gas composition being used as the contaminated source gas. All such variations, modifications and alternate embodiments are intended to be included within the present invention as defined by the claims.

What is claimed is:

1. A method of separating hydrogen gas from a source gas, comprising the steps of:
   providing a hydrogen permeable tube;
   providing a support tube, wherein said hydrogen permeable tube is disposed within said support tube and wherein said hydrogen permeable tube and said support tube are coaxially aligned so that a gap space exists between said hydrogen permeable tube and said support tube; and
   passing the source gas through said gap space between said hydrogen permeable tube and said support tube, wherein hydrogen from said source gas passes through said hydrogen permeable tube and is separated from said source gas.

2. The method according to claim 1, wherein said hydrogen permeable tube has a predetermined wall thickness.

3. The method according to claim 2, wherein said gap space is between two times and ten times said predetermined wall thickness.

4. The method according to claim 1, wherein said support tube is disposed within said hydrogen permeable tube.

5. The method according to claim 1, wherein said step of providing a hydrogen permeable tube, includes providing a plurality of hydrogen permeable tubes, wherein said plurality of hydrogen permeable tubes communicate with a first common chamber.

6. The method according to claim 5, wherein said step of providing a support tube includes providing a separate support tube for each of said hydrogen permeable tubes.

7. The method according to claim 1, further including the step of passing said source gas through a catalyst prior to said source gas entering said gap space.

8. The method according to claim 1, further including the step of passing said source gas through a catalyst within said gap space.

9. A method of separating hydrogen gas from a source gas, comprising the steps of:
   providing a hydrogen permeable tube;
   providing a support tube, wherein said hydrogen permeable tube and said support tube overlap and are coaxially aligned so that a gap space exists between said hydrogen permeable tube and said support tube;
   passing said source gas through a catalyst; and
   passing the source gas through said gap space between said hydrogen permeable tube and said support tube after passing through said catalyst, wherein hydrogen from said source gas passes through said hydrogen permeable tube and is separated from said source gas.

10. A hydrogen separator for separating hydrogen gas from a source gas, said hydrogen separator comprising:
    a hydrogen permeable tube having an open first end and a closed second end, wherein said hydrogen permeable tube extends inside said support tube, and wherein said hydrogen permeable tube is made of a hydrogen permeable material; and
    a support tube coaxially aligned with said hydrogen permeable tube, wherein a gap space exists between said hydrogen permeable tube and said support tube;
    wherein the source gas is introduced into said gap space by flowing through said support tube and hydrogen from said source gas passes through said hydrogen permeable tube from said gap space and is collected.

11. The separator according to claim 1, wherein said hydrogen permeable tube has a predetermined wall thickness and said gap is between two times and ten times said predetermined wall thickness.

12. The separator according to claim 1, having a plurality of hydrogen permeable tubes that all communicate with a first common chamber, wherein said plurality of hydrogen permeable tubes are coaxially aligned with separate support tubes.

13. The separator according to claim 12, wherein each of said support tubes communicates with a second common chamber.

14. The separator according to claim 1, further including a catalyst material, wherein said source gas flows through said catalyst material within said hydrogen separator.

15. The separator according to claim 14, wherein at least some of said catalyst material is present within said gap space.

16. The separator according to claim 1, further including at least one heating element for heating said hydrogen permeable tube to a predetermined operating temperature.

* * * * *